US011975531B2

(12) United States Patent
Kinoshita

(10) Patent No.: US 11,975,531 B2
(45) Date of Patent: May 7, 2024

(54) PRINTING APPARATUS

(71) Applicant: SEIKO EPSON CORPORATION, Tokyo (JP)

(72) Inventor: Ryohei Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/809,876

(22) Filed: Jun. 29, 2022

(65) Prior Publication Data

US 2023/0001715 A1 Jan. 5, 2023

(30) Foreign Application Priority Data

Jun. 30, 2021 (JP) ................................ 2021-108752

(51) Int. Cl.

| | |
|---|---|
| ***B41J 11/70*** | (2006.01) |
| ***B26D 5/06*** | (2006.01) |
| ***G03G 15/00*** | (2006.01) |
| *B26D 1/00* | (2006.01) |
| *B26D 1/06* | (2006.01) |
| *B26D 1/08* | (2006.01) |
| *B26D 5/00* | (2006.01) |

(52) U.S. Cl.

CPC ................ *B41J 11/70* (2013.01); *B26D 5/06* (2013.01); *G03G 15/6523* (2013.01); *B26D 2001/0066* (2013.01); *B26D 1/065* (2013.01); *B26D 1/085* (2013.01); *B26D 5/00* (2013.01)

(58) Field of Classification Search

CPC . B41J 11/70; B26D 5/06; B26D 1/065; B26D 1/085; B26D 5/00; B26D 2001/0066; G03G 15/6523

See application file for complete search history.

(56) References Cited

U.S. PATENT DOCUMENTS 1,342,887 A * 5/1920 Arnott ................ F16H 61/0293 74/348

2012/0219344 A1 8/2012 Kishi et al.

FOREIGN PATENT DOCUMENTS

JP H106606 A * 1/1998 ............. B41J 23/02

JP 2012-240286 12/2012

* cited by examiner

*Primary Examiner* — Yaovi M Ameh

(74) *Attorney, Agent, or Firm* — WORKMAN NYDEGGER

(57) ABSTRACT

A printing apparatus includes a cutter unit that includes a first blade that moves in a first direction from a standby position to a cutting position to cut a printing medium and a drive pin that moves integrally with the first blade, a drive cam which has a cylindrical shape and on a side surface of which a guide groove engaged with the drive pin is provided, and a driving motor that rotates the drive cam, in which, when the drive cam rotates, the guide groove guides, via the drive pin, the first blade in the first direction from the standby position to the cutting position.

3 Claims, 7 Drawing Sheets

PRINTING APPARATUS

The present application is based on, and claims priority from JP Application Serial Number 2021-108752, filed Jun. 30, 2021, the disclosure of which is hereby incorporated by reference herein in its entirety.

BACKGROUND

1. Technical Field

The present disclosure relates to a printing apparatus.

2. Related Art

As disclosed in JP-A-2012-240286, a printing apparatus that includes a cutter blade for cutting a printed sheet and two worm wheels engaged with two holes provided in the cutter blade has been known.

According to such a printing apparatus of the related art, which is configured to have two or more gears engaged with a cutter blade, it is difficult to reduce apparatus size.

SUMMARY

A printing apparatus according to the disclosure includes a cutter unit that includes a first blade that moves in a first direction from a standby position to a cutting position to cut a printing medium and a drive pin that moves integrally with the first blade, a rotating body which is a cylindrical shape and has a side surface on which a guide groove engaged with the drive pin is provided, and a driving motor that rotates the rotating body, in which, when the rotating body rotates, the guide groove guides, via the drive pin, the first blade in the first direction from the standby position to the cutting position.

DESCRIPTION OF EXEMPLARY EMBODIMENTS

Figure 1:
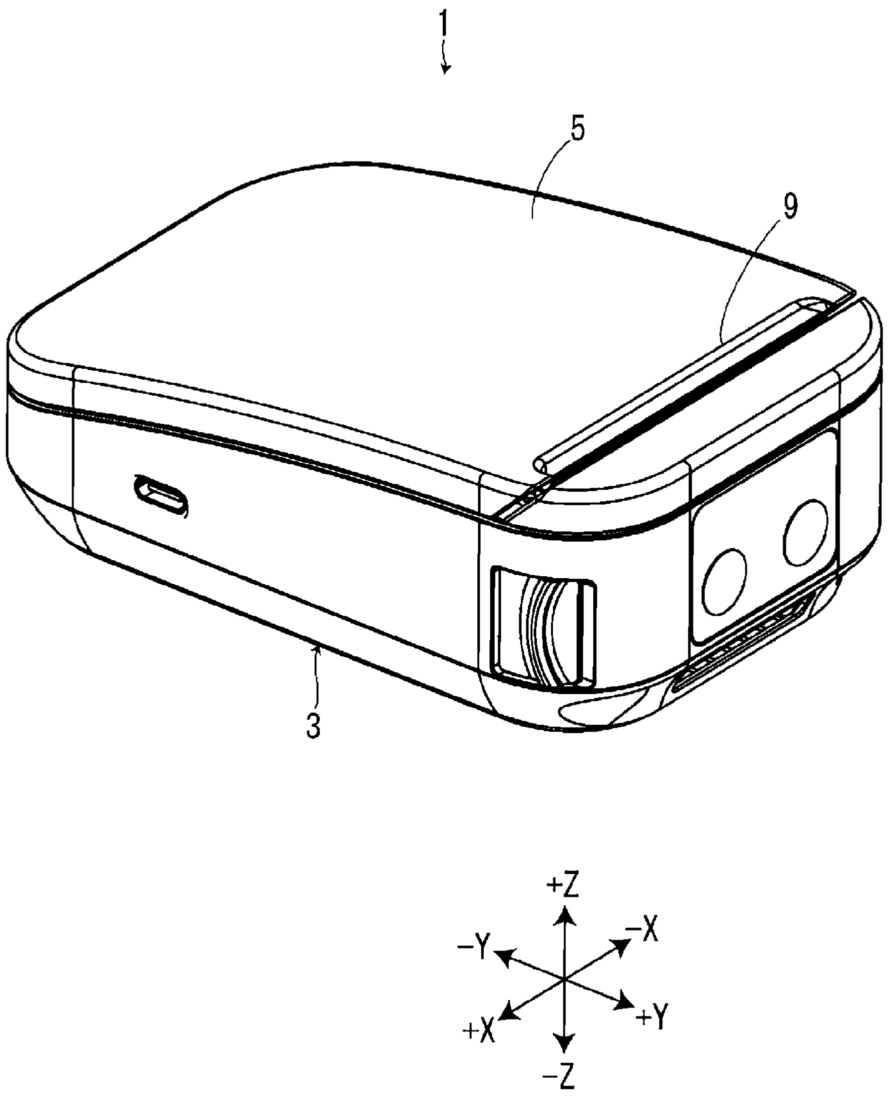
FIG. 1 is a perspective view of a printing apparatus in a state in which an opening/closing cover is closed.

A printing apparatus 1, which is an embodiment of a printing apparatus, will be described below with reference to the accompanying drawings. The printing apparatus 1 is a so-called mobile printer and has a portable size. Note that the following description will be given with reference to directions in the XYZ orthogonal coordinate system illustrated in the drawings. However, such directions are used merely for convenience of description and should not limit the embodiment described below.

Figure 2:
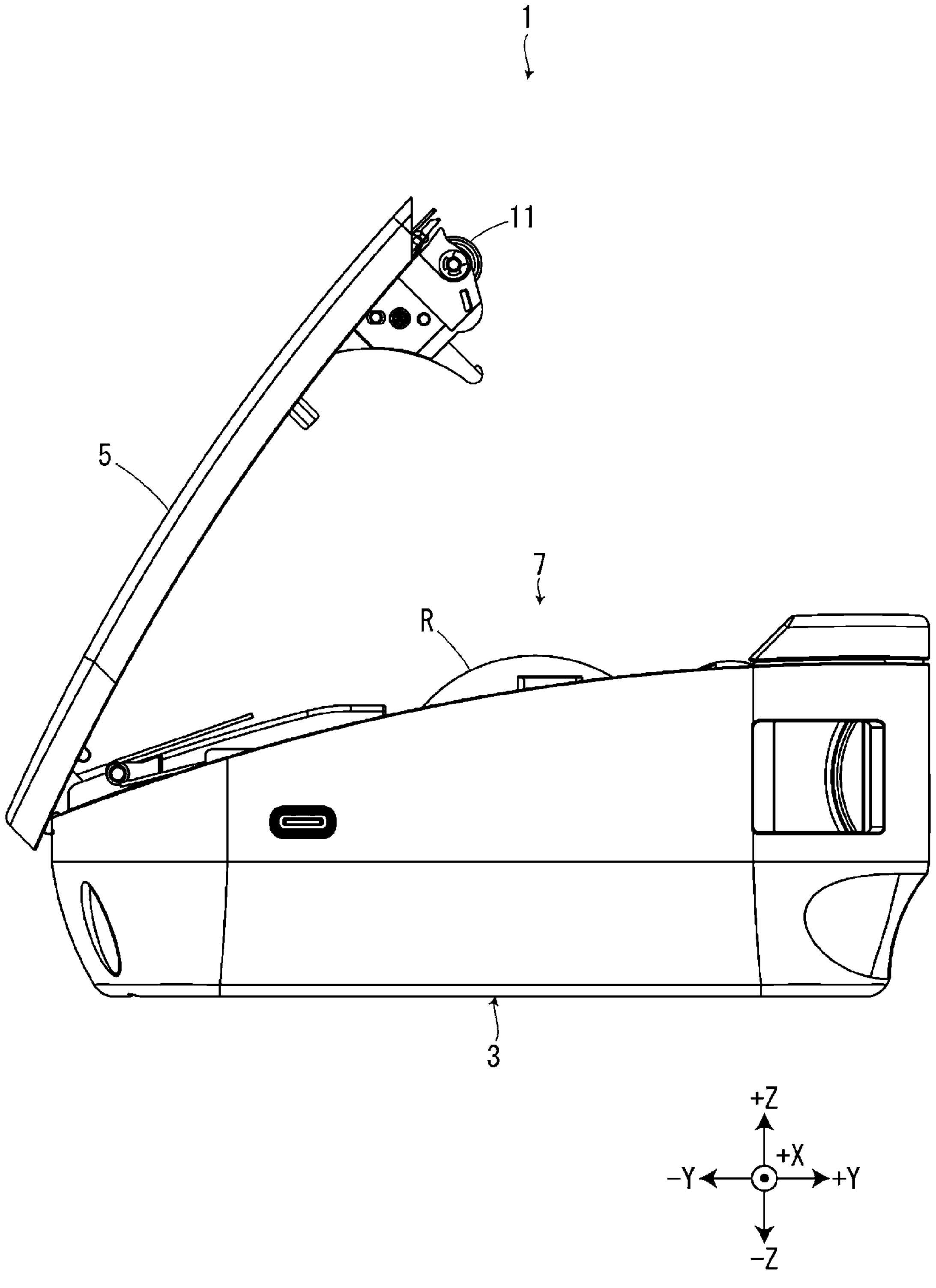
FIG. 2 illustrates the printing apparatus in a state in which the opening/closing cover is open when viewed from the +X direction side.

As illustrated in FIGS. 1 and 2, the printing apparatus 1 has a substantially rectangular parallelepiped shape and includes an apparatus case 3 and an opening/closing cover 5.

The apparatus case 3 has a box shape that is open on the +Z direction side, and a paper-roll holder 7 is provided in the apparatus case 3. A paper roll R obtained by rolling recording paper P (FIG. 3), which is a printing medium, is accommodated in the paper-roll holder 7. The paper roll R is placed into the paper-roll holder 7 by using a drop-in method. The printing apparatus 1 performs printing on the recording paper P drawn from the paper roll R accommodated in the paper-roll holder 7.

The opening/closing cover 5 enables the paper-roll holder 7 to be exposed and covered. The opening/closing cover 5 is attached to the −Y direction end of the apparatus case 3 so as to be rotatable about a shaft substantially parallel to the X direction. A discharge port 9 is provided between a tip end, that is, the +Y direction end, of the opening/closing cover 5 and the apparatus case 3. The discharge port 9 has a substantially rectangular shape elongated in the X direction.

Figure 3:
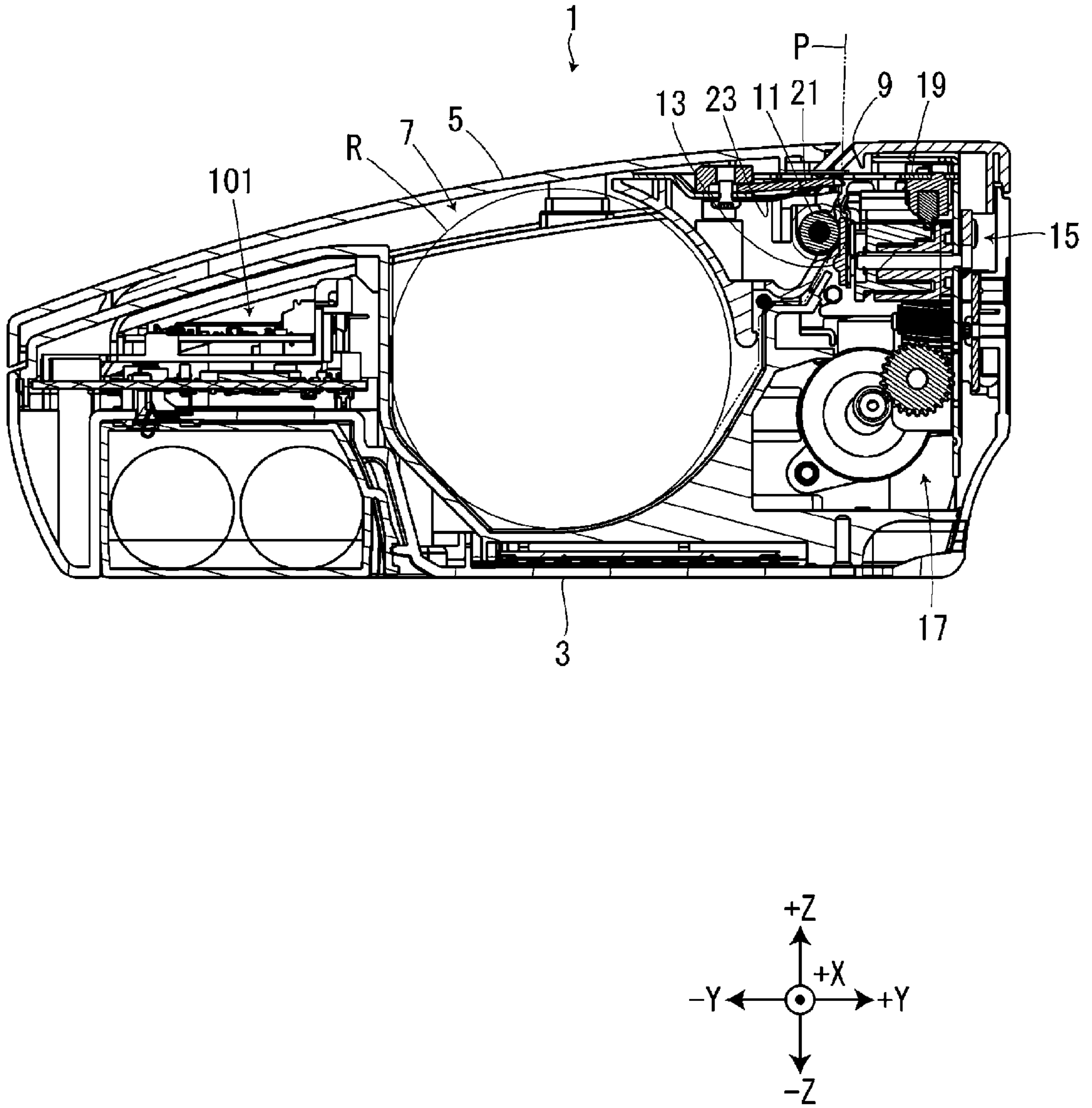
FIG. 3 is a sectional view of the printing apparatus in the state in which the opening/closing cover is closed.
Figure 4:
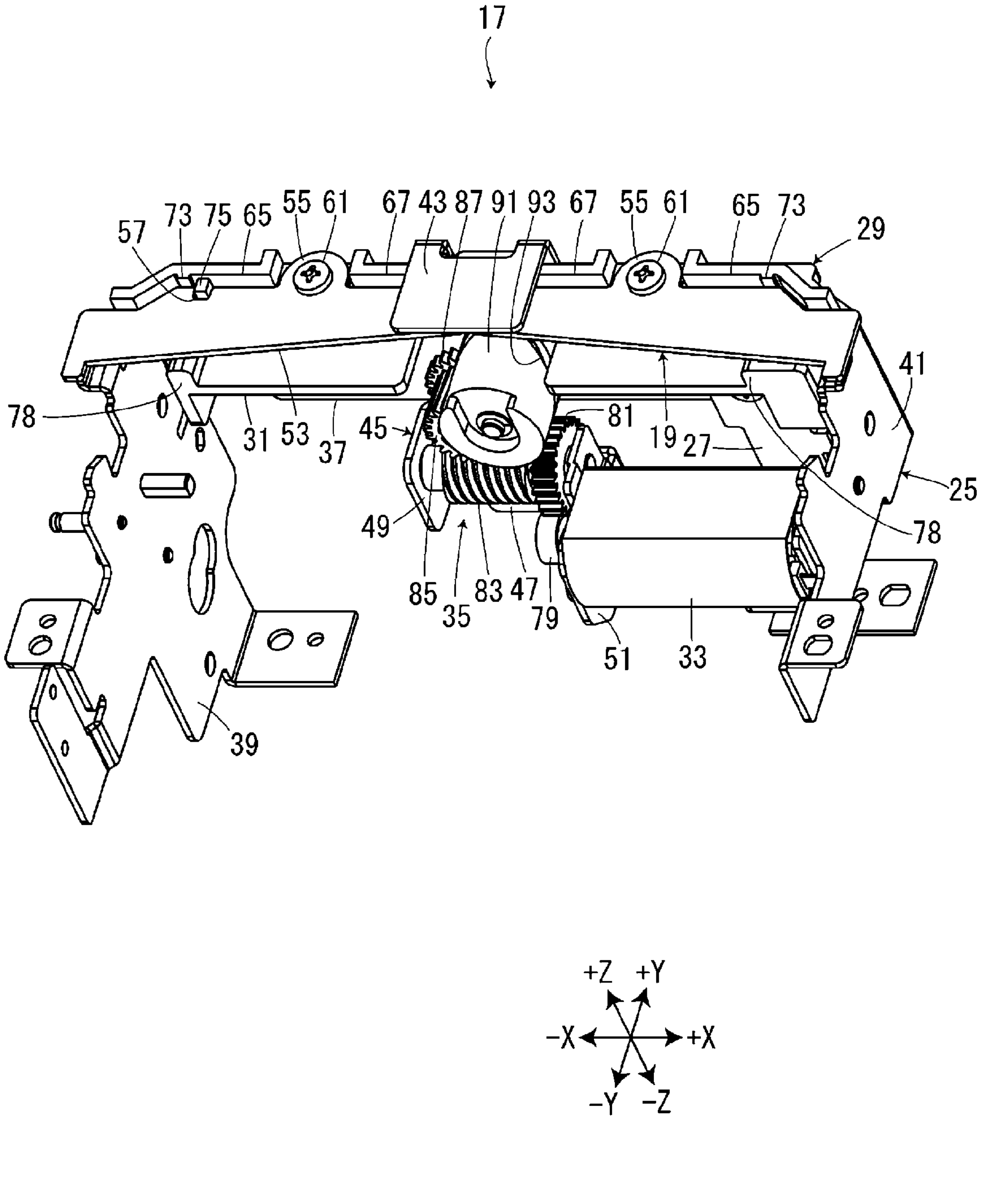
FIG. 4 is a perspective view of a cutter unit.
Figure 5:
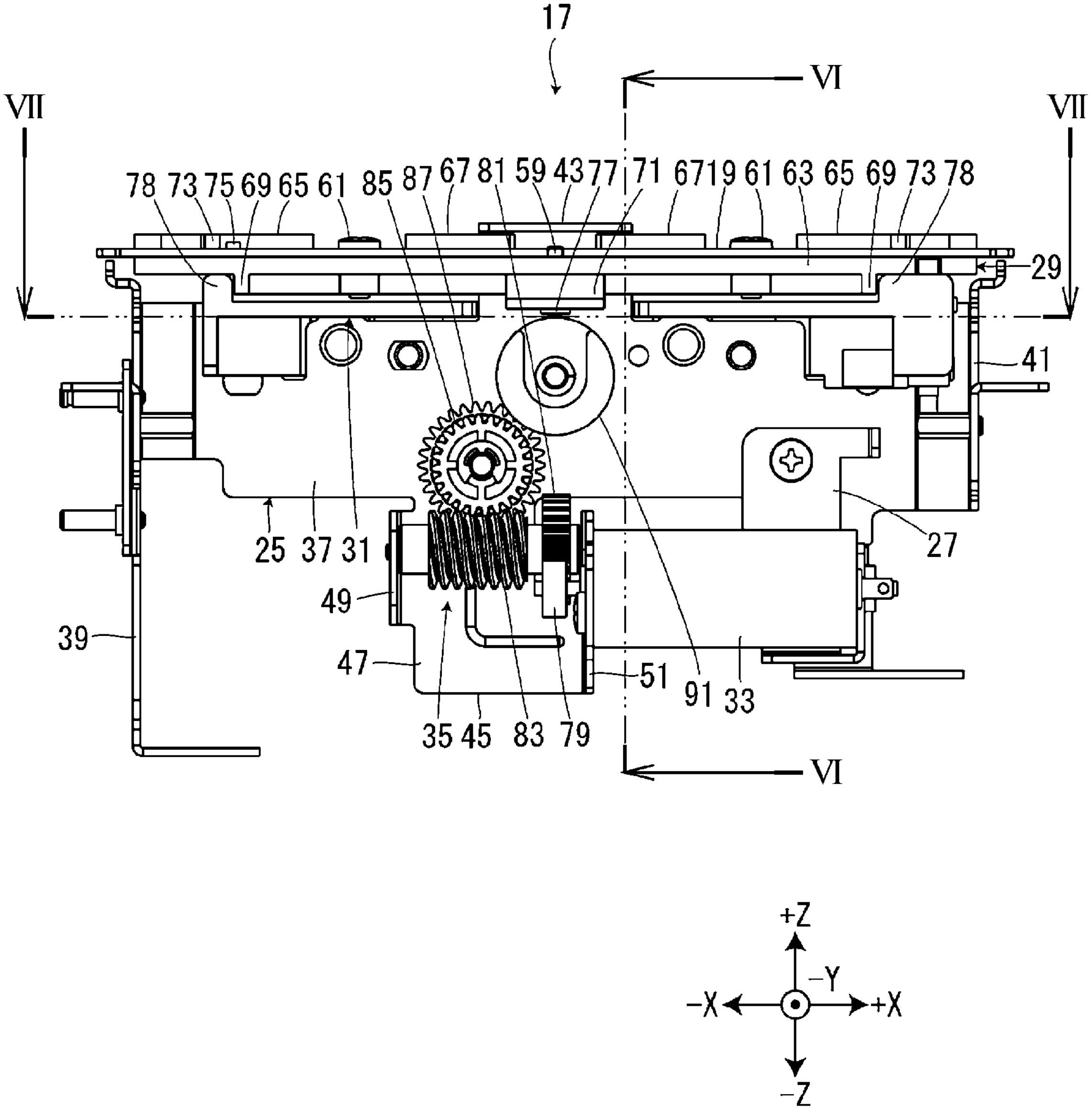
FIG. 5 illustrates the cutter unit when viewed from the −Y direction side.

As illustrated in FIG. 3, the printing apparatus 1 includes a platen roller 11, a thermal head 13, and a cutter 15.

The platen roller 11 is provided inside the opening/closing cover 5 so as to have a rotational direction substantially parallel to the X direction. The platen roller 11 holds the recording paper P against the thermal head 13 and is rotated by a feeding motor (not illustrated) as a driving source to thereby draw the recording paper P from the paper roll R and feed the recording paper P to the discharge port 9.

The thermal head 13 is provided in the apparatus case 3 so as to face the platen roller 11. The thermal head 13 includes a plurality of heat-generating elements (not illustrated) and performs printing on the recording paper P drawn from the paper roll R.

The cutter 15 cuts the recording paper P on a rear side of a printed portion in a width direction of the recording paper P, that is, the X direction. The cutter 15 includes: a cutter unit 17 having a first blade 19; a second blade 21; and a cutter spring 23. The cutter unit 17 is provided in a +Y direction end portion in the apparatus case 3. The first blade 19 separates from and comes into contact with the second blade 21 to cut the recording paper P between the first blade 19 and the second blade 21. That is, the first blade 19 functions as a movable blade, and the second blade 21 functions as a fixed blade. The cutter unit 17 will be specifically described later.

The second blade 21 is located in the −Y direction with respect to the first blade 19 and provided inside the opening/closing cover 5. The first blade 19 and the second blade 21 overlap each other such that the first blade 19 is on the +Z direction side and the second blade 21 is on the −Z direction side when the first blade 19 performs shearing toward the second blade 21. The cutter spring 23 applies a force to the second blade 21 in the +Z direction such that the first blade 19 appropriately shears against the second blade 21 when the first blade 19 performs shearing toward the second blade 21.

As illustrated in FIGS. 4 to 7, the cutter unit 17 includes a cutter frame 25, a motor supporting member 27, a cutter holder 29, a cutter guide 31, a driving motor 33, and a power transferring section 35, in addition to the first blade 19 described above.

The cutter frame 25 supports the first blade 19, the motor supporting member 27, the cutter holder 29, the cutter guide 31, the driving motor 33, and the power transferring section 35. The cutter frame 25 includes a first frame 37, a second frame 39, a third frame 41, a fourth frame 43, and a fifth frame 45.

The first frame 37 has a substantially rectangular plate shape substantially parallel to the X-Z plane. The second frame 39 extends in the −Y direction from the −X direction end of the first frame 37 and has a plate shape substantially parallel to the Y-Z plane. The third frame 41 extends in the −Y direction from the +X direction end of the first frame 37 and has a plate shape substantially parallel to the Y-Z plane.

The fourth frame 43 extends in the −Y direction from a substantially central portion in the X direction in the +Z direction end of the first frame 37 and has a substantially rectangular plate shape substantially parallel to the X-Y plane. The fourth frame 43 is located in the +Z direction with a slight gap formed against the cutter holder 29 so as to regulate the position of the cutter holder 29 in the +Z direction.

The fifth frame 45 includes a coupling section 47, a first gear supporter 49, and a second gear supporter 51. The coupling section 47 extends in the −Z direction from a substantially central portion in the X direction in the −Z direction end of the first frame 37 and has a substantially rectangular plate shape substantially parallel to the X-Z plane. The coupling section 47 enables the first gear supporter 49 to be coupled to the second gear supporter 51. The first gear supporter 49 extends in the −Y direction from the −X direction end of the coupling section 47. The second gear supporter 51 extends in the −Y direction from the +X direction end of the coupling section 47.

The motor supporting member 27 is attached to the first frame 37 of the cutter frame 25. The motor supporting member 27 supports the driving motor 33.

Figure 6:
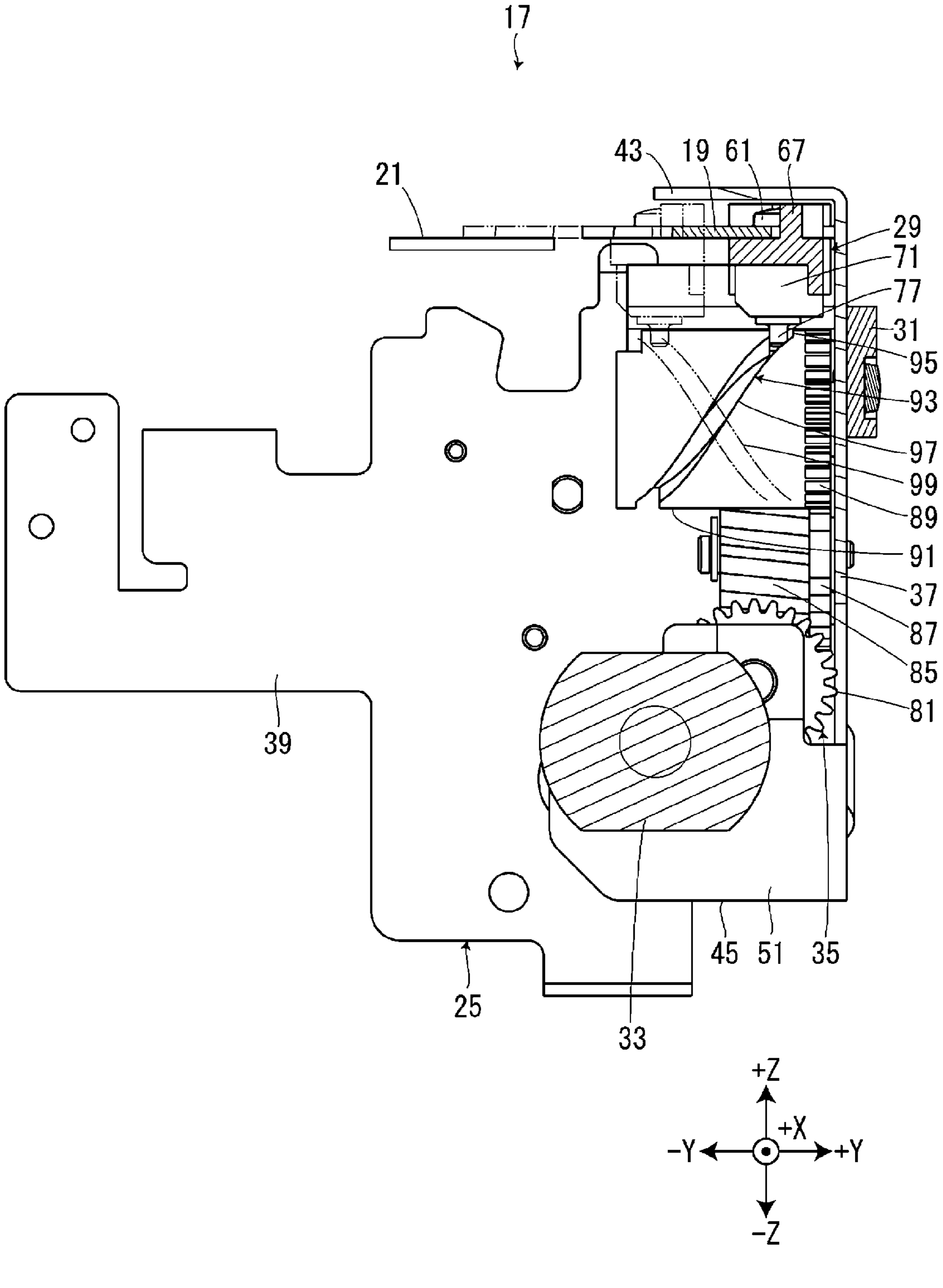
FIG. 6 is a sectional view along line VI-VI in FIG. 5.
Figure 7:
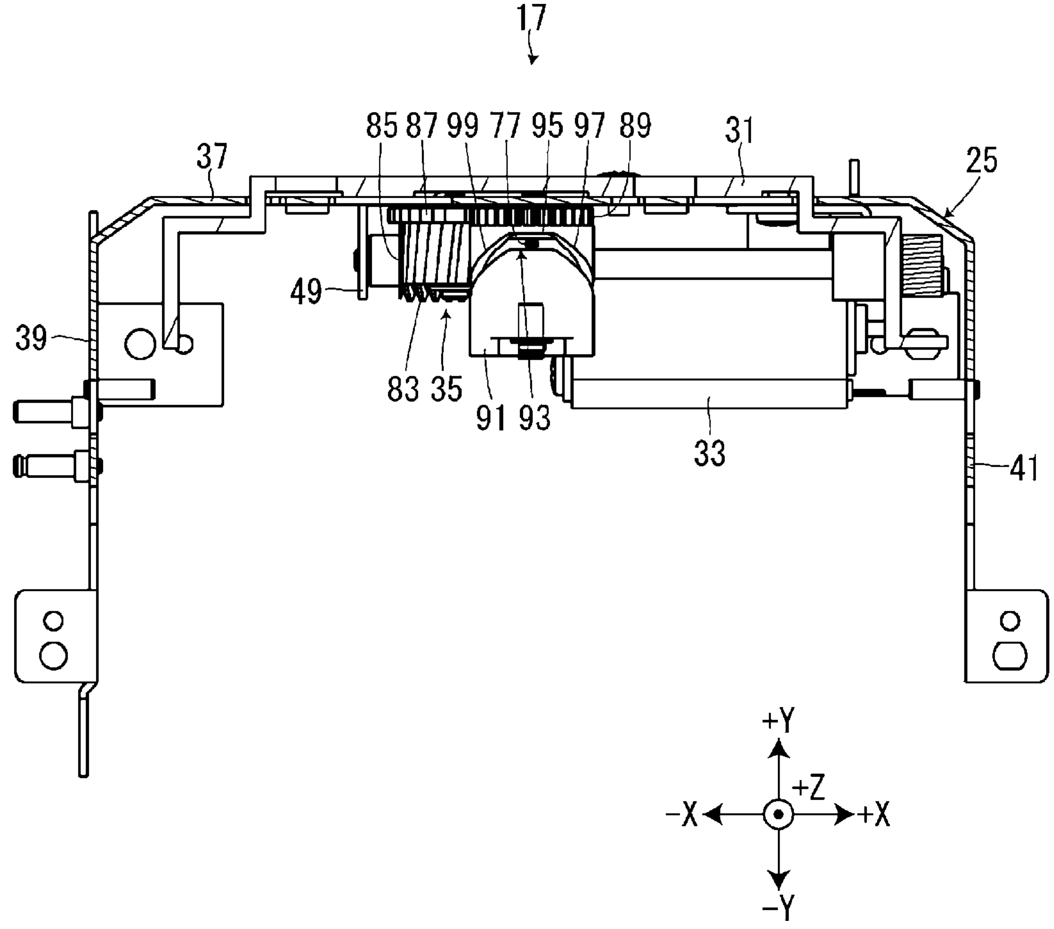
FIG. 7 is a sectional view along line VII-VII in FIG. 5.

The first blade 19 is movable in the Y direction between a standby position and a cutting position integrally with the cutter holder 29. Here, the standby position is a position farthest from the second blade 21 in a movement range of the first blade 19, that is, a position furthest in the +Y direction in the movement range of the first blade 19. Moreover, the cutting position is a position closest to the second blade 21 in the movement range of the first blade 19, that is, a position furthest in the −Y direction in the movement range of the first blade 19. In FIG. 6, the first blade 19 and the cutter holder 29 when the first blade 19 is at the standby position are indicated by solid lines, and the first blade 19 and the cutter holder 29 when the first blade 19 is at the cutting position are indicated by two-dot chain lines. The first blade 19 moves in the −Y direction from the standby position to the cutting position to cut the recording paper P.

The first blade 19 has a substantially rectangular plate shape elongated in the X direction. The first blade 19 includes a cutting edge 53, two screw stoppers 55, and a positioning recess 57. The cutting edge 53 is provided in the −Y direction end of the first blade 19 and is substantially V-shaped. A cutout 59 (FIG. 5) is provided in a substantially central portion of the cutting edge 53 in the X direction. Since the recording paper P is thereby cut while a portion of the recording paper P in the width direction remains uncut, the cut recording paper P remains at the discharge port 9 without falling from the discharge port 9. The two screw stoppers 55 protrude from two portions in the +Y direction end of the first blade 19 so as to be symmetrical about a central portion of the first blade 19 in the X direction in each a substantially semicircular shape in the +Y direction. A screw stopper 55 includes a blade hole (not illustrated) into which a fixing screw 61 is inserted. The first blade 19 is screwed to the cutter holder 29 by the fixing screw 61. The positioning recess 57 is provided in the vicinity of a −X direction end portion in the +Y direction end of the first blade 19. The positioning recess 57 is engaged with a positioning protrusion 75 of the cutter holder 29.

The cutter holder 29 holds the first blade 19. The cutter holder 29 is provided so as to slidably move in the Y direction with respect to the cutter guide 31. The cutter holder 29 includes a holder main body 63, two first protrusions 65, two second protrusions 67, two holder protrusions 69, and a drive protrusion 71.

The holder main body 63 has a substantially rectangular plate shape substantially parallel to the X-Y plane. The respective two first protrusions 65 protrude in the +Z direction from a +X direction end portion and a −X direction end portion in the +Y direction end of the holder main body 63. The respective two second protrusions 67 protrude in the +Z direction from portions between the two first protrusions 65 in the +Y direction end of the holder main body 63. The two second protrusions 67 are located in the −Z direction with respect to the fourth frame 43. The screw stopper 55 of the first blade 19 is interposed between a first protrusion 65 and a second protrusion 67. That is, a holder hole (not illustrated) into which the fixing screw 61 is inserted is provided between the first protrusion 65 and the second protrusion 67 in the holder main body 63.

A pressing section 73 protrudes in the −Y direction from each of the two first protrusions 65. The two pressing sections 73 are in contact with the +Y direction end surface of the first blade 19 and press the first blade 19 against the second blade 21 when the first blade 19 is moved to the cutting position. The two pressing sections 73 are provided so as to be symmetrical about the central portion of the first blade 19 in the X direction. Accordingly, it is possible to equalize loads applied by the two pressing sections 73 to the first blade 19 in the X direction.

The positioning protrusion 75 protrudes in the −Y direction from one of the two first protrusions 65, which is located in the −X direction. The positioning protrusion 75 engages the positioning recess 57 of the first blade 19. When the positioning protrusion 75 engages the positioning recess 57, the first blade 19 is positioned with respect to the cutter holder 29.

The respective two holder protrusions 69 protrude in the −Z direction from the −X direction end and the +X direction end of the holder main body 63. The respective two holder protrusions 69 are engaged with inner surfaces of two guiding protrusions 78 in the X direction.

The drive protrusion 71 protrudes in the −Z direction from a substantially central portion of the holder main body 63 in the X direction. A drive pin 77 protrudes in the −Z direction from the −Z direction surface of the drive protrusion 71. The drive pin 77 is engaged with a guide groove 93 of a drive cam 91 described later and functions as a drive point of the first blade 19. The drive pin 77 is provided at a position corresponding to a central portion of the first blade 19 in the X direction, that is, a central portion of the first blade 19 in a direction orthogonal to a movement direction of the first blade 19. Accordingly, it is possible to equalize loads applied by the drive pin 77 to the first blade 19 via the cutter holder 29 in the X direction.

The cutter guide 31 is attached to the first frame 37 of the cutter frame 25. The cutter guide 31 includes the two guiding protrusions 78. The respective two guiding protrusions 78 protrude in the +Z direction from the −X direction end and the +X direction end of the cutter guide 31. The cutter holder 29 is mounted in the +Z direction with respect to the two guiding protrusions 78. The respective two guiding protrusions 78 are engaged with outer surfaces of the two holder protrusions 69 in the X direction. When the cutter holder 29 moves in the Y direction, the two guiding protrusions 78 regulate movement of the cutter holder 29 in the X direction and guide the cutter holder 29 so as to move in the Y direction.

The driving motor 33 is supported by the motor supporting member 27. The driving motor 33 is a driving source for the first blade 19. An output gear 79 is provided on a shaft of the driving motor 33. A rotational axis of the output gear 79 is substantially parallel to the X direction.

The power transferring section 35 transfers power of the driving motor 33 to the first blade 19 via the cutter holder 29. The power transferring section 35 includes a first gear 81, a worm 83, a worm wheel 85, a second gear 87, a third gear 89, and the drive cam 91.

The first gear 81 and the worm 83 are rotatably supported between the first gear supporter 49 and the second gear supporter 51 so as to have a rotational axis substantially parallel to the X direction. The first gear 81 is engaged with the output gear 79. The worm 83 is provided coaxially with the first gear 81 and rotates integrally with the first gear 81.

The worm wheel 85, the second gear 87, the third gear 89, and the drive cam 91 are rotatably provided at the first frame 37 so as to have a rotational axis substantially parallel to the Y direction. The worm wheel 85 is engaged with the worm 83. The second gear 87 is provided coaxially with the worm wheel 85 and rotates integrally with the worm wheel 85. The third gear 89 is engaged with the second gear 87. The drive cam 91 is provided coaxially with the third gear 89 and rotates integrally with the third gear 89.

In this manner, rotation of the driving motor 33 is transferred to the drive cam 91 via the first gear 81, the worm 83, the worm wheel 85, the second gear 87, and the third gear 89. That is, the driving motor 33 enables the drive cam 91 to rotate via the first gear 81, the worm 83, the worm wheel 85, the second gear 87, and the third gear 89.

The drive cam 91 has a substantially cylindrical shape. The drive cam 91 is located in the −Z direction with respect to the drive pin 77. The guide groove 93 is formed on a side surface, that is, an outer circumferential surface, of the drive cam 91. The drive pin 77 is engaged with the guide groove 93. The guide groove 93 has an annular shape in a circumferential direction of the drive cam 91, that is, a substantially elliptical circumferential shape inclined in the Y direction and includes an orthogonal section 95, a first guide groove 97, and a second guide groove 99.

The orthogonal section 95 is provided in the +Y direction end of the outer circumferential surface of the drive cam 91 and extends in a direction orthogonal to the Y direction serving as the movement direction of the first blade 19, that is, the X direction. The +X direction end of the orthogonal section 95 is coupled to the first guide groove 97, and the −X direction end of the orthogonal section 95 is coupled to the second guide groove 99. Note that the first guide groove 97 corresponds to a range of substantially half the circumference of the guide groove 93, that is, from the +X direction end of the orthogonal section 95 to the −Y direction end of the guide groove 93. Moreover, the second guide groove 99 corresponds to a range of substantially half the circumference of the guide groove 93, that is, from the −X direction end of the orthogonal section 95 to the −Y direction end of the guide groove 93.

In a state in which the drive pin 77 is engaged with the orthogonal section 95, the first blade 19 is at the standby position. At this time, the orthogonal section 95 suppresses movement of the drive pin 77 in the Y direction. Thus, movement of the first blade 19 in the Y direction is suppressed. Accordingly, even in an instance in which the printing apparatus 1 is subjected to an impact, for example, when a user drops the printing apparatus 1 onto the floor or knocks the printing apparatus 1 against an object while carrying the printing apparatus 1, it is possible to suppress movement of the first blade 19 in the Y direction. As a result, it is possible to suppress a failure of the cutter 15, such as a failure in which the first blade 19 overlaps the second blade 21 on the side opposite to the typical side, that is, in the −X direction, when the first blade 19 moves in response to such an impact.

When the drive cam 91 rotates in a first rotational direction, that is, counterclockwise when viewed from the −Y direction side, in a state in which the drive pin 77 is engaged with the orthogonal section 95, the drive pin 77 moves relatively from the orthogonal section 95 to the first guide groove 97. When the drive cam 91 rotates in the first rotational direction in a state in which the drive pin 77 is engaged with the first guide groove 97, the first guide groove 97 guides the drive pin 77 in the −Y direction to guide the first blade 19 in the −Y direction from the standby position to the cutting position.

When the drive cam 91 further rotates in the first rotational direction in the state in which the drive pin 77 is engaged with the first guide groove 97, the drive pin 77 moves relatively from the first guide groove 97 to the second guide groove 99. When the drive cam 91 rotates in the first rotational direction in a state in which the drive pin 77 is engaged with the second guide groove 99, the second guide groove 99 guides the drive pin 77 in the +Y direction to guide the first blade 19 in the +Y direction from the cutting position to the standby position.

When the drive cam 91 further rotates in the first rotational direction in the state in which the drive pin 77 is engaged with the second guide groove 99, the drive pin 77 moves relatively from the second guide groove 99 to the orthogonal section 95. When the drive pin 77 returns to the orthogonal section 95, the first blade 19 also returns to the standby position.

In this manner, when the drive cam 91 makes a substantially half rotation in the first rotational direction in the state in which the drive pin 77 is engaged with the orthogonal section 95, the drive pin 77 moves in the −Y direction, and the first blade 19 moves from the standby position to the cutting position. When the drive cam 91 further makes a substantially half rotation in the first rotational direction, the drive pin 77 moves in the +Y direction, and the first blade 19 returns from the cutting position to the standby position. In this manner, since the rotational direction of the drive cam 91 is the same between when the first blade 19 is caused to move in the −Y direction from the standby position to the cutting position and when the first blade 19 is caused to move in the +Y direction from the cutting position to the standby position, it is possible to simplify the structure of the cutter unit 17 and control of the cutter unit 17. Note that movement of the first blade 19 to the standby position and movement of the first blade 19 to the cutting position are detected by a sensor (not illustrated). A control circuit 101 (FIG. 3) controls the driving motor 33 in accordance with an output from the sensor.

As described above, according to the printing apparatus 1 of the present embodiment, the drive pin 77 serving as the drive point of the first blade 19 moves in the Y direction integrally with the first blade 19 while the first blade 19 moves in the Y direction. Thus, it is not necessary to provide two drive points so as to be symmetrical about the central portion of the first blade 19 in the X direction to equalize loads applied by the drive pin 77 to the first blade 19 via the cutter holder 29 in the X direction. As a result, it is sufficient that a single part of the drive cam 91 be provided as a part, such as a gear, that is engaged with the drive point, and two or more such parts are not required, thus making it possible to achieve a size reduction of the printing apparatus 1. Other modified examples Needless to say, the disclosure is not limited to the embodiment described above, and various configurations can be employed without departing from the scope of the disclosure. For example, the embodiment described above can be changed to incorporate the following aspects in addition to those described above. A configuration in which the embodiment and a modified example are combined may be adopted.

The guide groove 93 is not limited to being configured to have the annular shape in the circumferential direction of the drive cam 91 and may be configured to be formed in only a portion in the circumferential direction of the drive cam 91. In such an instance, the rotational direction of the drive cam 91 may be switched between when the first blade 19 is caused to move in the −Y direction from the standby position to the cutting position and when the first blade 19 is caused to move in the +Y direction from the cutting position to the standby position.

A printing system of the printing apparatus 1 is not limited to a thermal system and may be, for example, an ink jet system or an electrophotographic system.

The printing apparatus 1 is not limited to a mobile printer and may be one installed on a desk, the floor, or the like.

Additional Notes

Hereinafter, additional notes on a printing apparatus will be given.

A printing apparatus includes a cutter unit that includes a first blade that moves in a first direction from a standby position to a cutting position to cut a printing medium and a drive pin that moves integrally with the first blade, a rotating body which has a cylindrical shape and on a side surface of which a guide groove engaged with the drive pin is provided, and a driving motor that rotates the rotating body, in which, when the rotating body rotates, the guide groove guides, via the drive pin, the first blade in the first direction from the standby position to the cutting position.

According to such a configuration, the drive pin serving as a drive point of the first blade moves in the first direction integrally with the first blade while the first blade moves in the first direction. Thus, it is not necessary to provide two drive points so as to be symmetrical about a central portion of the first blade in a third direction, which is orthogonal to the first direction, to equalize loads applied by the drive pin to the first blade in the third direction. As a result, it is sufficient that a single part of the rotating body be provided as a part, such as a gear, that is engaged with the drive point, and two or more such parts are not required, thus making it possible to achieve a size reduction of the printing apparatus.

Note that the drive cam 91 is an example of the rotating body. The −Y direction is an example of the first direction. The X direction is an example of the third direction.

In such an instance, the guide groove may have an annular shape in a circumferential direction of the rotating body, and when the rotating body makes a single rotation, the guide groove may, via the drive pin, guide the first blade in the first direction from the standby position to the cutting position and then guide the first blade in a second direction opposite to the first direction from the cutting position to the standby position.

According to such a configuration, since the rotational direction of the rotating body is the same between when the first blade is caused to move in the first direction from the standby position to the cutting position and when the first blade is caused to move in the second direction from the cutting position to the standby position, it is possible to simplify the structure of the cutter unit and control of the cutter unit.

Note that the +Y direction is an example of the second direction.

In such an instance, the guide groove may include an orthogonal section that extends in the third direction, which is orthogonal to the first direction, and the drive pin may engage the orthogonal section when the first blade is at the standby position.

According to such a configuration, even in an instance in which the printing apparatus is subjected to an impact when the first blade is at the standby position, it is possible to suppress movement of the first blade in the first direction.

In such an instance, the drive pin may be provided at a position corresponding to a central portion of the first blade in the third direction, which is orthogonal to the first direction.

According to such a configuration, it is possible to equalize loads applied by the drive pin to the first blade in the third direction.

What is claimed is:

1. A printing apparatus comprising:
a cutter unit that includes
a first blade that moves in a first direction from a standby position to a cutting position to cut a printing medium;
a drive pin that moves integrally with the first blade;
a rotating body which is a cylindrical shape and has a side surface on which a guide groove engaged with the drive pin is provided; and
a driving motor that rotates the rotating body, wherein,
when the rotating body rotates, the guide groove guides, via the drive pin, the first blade in the first direction from the standby position to the cutting position,
the drive pin is provided at a position corresponding to a central portion of the first blade in a third direction, which is orthogonal to the first direction.

2. The printing apparatus according to claim 1, wherein
the guide groove has an annular shape in a circumferential direction of the rotating body, and
when the rotating body makes a single rotation, the guide groove, via the drive pin, guides the first blade in the first direction from the standby position to the cutting position and then guides the first blade in a second direction opposite to the first direction from the cutting position to the standby position.

3. The printing apparatus according to claim 1, wherein
the guide groove includes an orthogonal section that extends in a third direction, which is orthogonal to the first direction, and
the drive pin engages the orthogonal section when the first blade is at the standby position.

* * * * *